(12) United States Patent
Alard

(10) Patent No.: US 6,862,451 B1
(45) Date of Patent: Mar. 1, 2005

(54) CELLULAR RADIO SIGNAL WITH ADDITIONAL CHANNEL ASSIGNED TO DOWNLINK, CORRESPONDING METHOD, SYSTEM AND BASE STATION

(75) Inventor: Michel Alard, Paris (FR)

(73) Assignee: Wavecom, Issy-les-Moulineaux (FR)

( * ) Notice: Subject to any disclaimer, the term of this patent is extended or adjusted under 35 U.S.C. 154(b) by 0 days.

(21) Appl. No.: 09/673,114
(22) PCT Filed: Apr. 12, 1999
(86) PCT No.: PCT/FR99/00849
§ 371 (c)(1), (2), (4) Date: Oct. 10, 2000
(87) PCT Pub. No.: WO99/53644
PCT Pub. Date: Oct. 21, 1999

(30) Foreign Application Priority Data

Apr. 10, 1998 (FR) .................................. 98 04883

(51) Int. Cl.$^7$ ............................................ H04Q 7/20
(52) U.S. Cl. ................ 455/450; 455/452.1; 455/451; 455/452; 455/453; 455/454; 455/179.1; 455/323; 455/334; 455/464; 455/505; 370/335; 370/342; 370/328; 370/329; 370/210; 370/468
(58) Field of Search .................. 370/335, 342, 370/468, 210, 328, 329; 455/452.1, 451, 452, 453, 454, 334, 179.1, 323, 464, 509

(56) References Cited

U.S. PATENT DOCUMENTS

| | | | | |
|---|---|---|---|---|
| 5,428,613 A | * | 6/1995 | Spiotta et al. | 370/458 |
| 5,446,739 A | * | 8/1995 | Nakano et al. | 370/337 |
| 5,483,529 A | * | 1/1996 | Baggen et al. | 370/484 |
| 6,226,521 B1 | * | 5/2001 | Liu et al. | 455/453 |
| 6,230,016 B1 | * | 5/2001 | Benveniste | 455/450 |
| 6,483,820 B1 | * | 11/2002 | Davidson et al. | 370/329 |

FOREIGN PATENT DOCUMENTS

| | | |
|---|---|---|
| EP | 786 890 | 7/1997 |
| FR | 2 733 869 | 11/1996 |
| WO | 98/02982 | 1/1998 |

* cited by examiner

Primary Examiner—Nay Maung
Assistant Examiner—Sujatha Sharma
(74) Attorney, Agent, or Firm—Merchant & Gould P.C.

(57) ABSTRACT

The invention concerns a cellular radio telephone signal comprising a symmetrical two-way main channel, including a main uplink and a main downlink, in particular transmitting low or medium speed data and signaling and control data, and comprising at least one additional channel solely assigned to the downlink, transmitting in particular, high speed data transmission. At one given time, all or part of said supplementary channel transmission capacity can be dynamically allocated to a particular mobile station. Information for retrieving data intended for a particular mobile station and carried by said supplementary channel can be transmitted among said main downlink signaling and control data.

1 Claim, 3 Drawing Sheets

CELLULAR RADIO SIGNAL WITH ADDITIONAL CHANNEL ASSIGNED TO DOWNLINK, CORRESPONDING METHOD, SYSTEM AND BASE STATION

The field of the invention is that of cellular radiotelephony. More exactly, the invention concerns data transmission, particularly at high speeds, in a radiotelephone system.

Known radiotelephone systems, such as the G.S.M. are essentially dedicated to voice communications. They implement two symmetrical links: a downlink (from a terrestrial base station to a mobile station) and an uplink (from the mobile station to the base station).

Systems under development are also based on such a structure. Thus, the standard UMTS defined by the ETSI provides for a symmetrical division between the downlink and the uplink.

The invention applies particularly to these systems. It can also be applied to satellite systems (GLOBALSTAR, ICO, IRIDIUM, etc.).

One of the problems to which radiotelephone systems will have to find a response in years to come, is the advent of new services and new applications, presupposing very high speed data transmission. Recent studies thus show that the resource allocated to data transfers (files, sounds, fixed or animated images), particularly via the Internet network, or similar networks, will represent a preponderant part of the resource available, from the year 2005 onwards, and higher, in the end, than the resource allocated to voice communications which should remain approximately constant.

A particular object of the invention is to bring a solution adapted to these new needs.

More exactly, an objective of the invention is to provide new cellular radiotelephone technology, allowing high speed data transmission, to radiotelephone mobile stations.

Another objective of the invention is to provide technology of this kind, which is compatible with known standards, and in particular the UMTS standard as defined by the ETSI.

Another objective of the invention is to provide technology of this kind, which optimises the use of the resource available, and which is based on a transmission method particularly adapted to high speed data transmission. Particularly, an objective of the invention is to offer an available speed of at least 6 Mbits/s.

Another objective of the invention is to provide technology of this kind, which allows technically relatively simple and therefore inexpensive mobile stations to be made, which are adapted to receive different types of data (voice communications and high speed data particularly).

Another objective of the invention is to provide technology of this kind, allowing high speed data reception, even in unfavorable reception conditions (high displacement rate, of the order of at least 250 km/h, and multiple paths particularly).

Still another objective of the invention is to provide technology of this kind, which allows an optimised and flexible allocation of the transmission resource, between one or more mobile stations, at a given moment. In particular, an objective of the invention is to allow the sharing of the high speed transmission resource between several operators.

These objectives, as well as others which will emerge subsequently, are met according to the invention by means of a cellular radiotelephone signal, of the type including a main symmetrical bidirectional channel, including a main uplink and a main downlink, providing in particular low or medium speed transmission of signalling and control data and information, and also including at least one additional channel solely assigned to the downlink, providing in particular high speed data transmission.

The invention therefore proposes an entirely new signal structure, in the context of radiotelephony, and more generally telephony systems. Indeed, all these systems are based on a symmetrical structure (based on the structure of voice communications). On the other hand, the technology of the invention is based on an entirely new, asymmetrical approach, which proves particularly adapted to new high speed applications.

In other words, the invention proposes the addition, to a conventional symmetrical channel, of a downlink only additional channel, dedicated to high speed data transmission, such as files transmitted on the Internet network.

It is appropriate to note that this solution is not obvious. It is based on a new analysis of radiotelephone systems, counter to the usual practices of the professional.

Although in what follows only one additional channel is considered, it is plain that several channels (corresponding for example to several frequency bands) are conceivable.

Preferentially, at a given moment, all or part of the transmission capacity of said additional channel is allocated dynamically to a particular mobile station.

Thus, the resource is allocated dynamically, only when required. It may be shared, frequentially and/or temporally, between several mobile stations. When demand is not heavy, only one part of the resource (frequentially or temporally) is allocated.

To do this, information allowing the retrieval of data intended for a particular mobile station and carried by said additional channel is, to advantage, transmitted among said signalling and control information of said main downlink.

According to an advantageous characteristic of the invention, said main down channel and said additional channel have synchronous frame structures.

This allows synchronisation of the mobile station to be recovered from one of the channels (in particular the main channel) and for it to be applied directly to the other channel (in particular the additional channel). This is advantageous in particular when one of the channels implements a technique allowing a recovery of simple and precise synchronisation (the case of CDMA particularly).

According to an advantageous embodiment of the invention, said additional channel also provides the transmission of signalling and control information.

Particularly, said additional channel can provide at least the transmission of signalling and control information intended for the mobile station(s) in the method of transmitting data intended for said mobile station, on said additional channel.

For example, when said additional channel carries high speed data intended for said mobile station, said signalling and control information intended for a mobile station is duplicated or switched from said main downlink onto said additional channel.

Thus, the mobile may receive, at a given moment, only one or other of the channels. This allows the structure of the receiver to be considerably simplified, by sharing at least a part of the reception means.

According to a particular embodiment of the invention, said main channel implements a spread spectrum access technology (CDMA). Particularly, the invention applies to the UMTS system.

Furthermore, to advantage, said additional channel implements a multi-carrier technology providing distribution of the data in the time/frequency space.

By multi-carrier technology is meant the implementation of a multiplex of carrier frequencies (for example according to OFDM technology).

In particular, said additional channel implements to advantage "IOTA" modulation technology, the complex envelope of which responds to the following equation:

$$x(t) = \sum_{m,n} a_{m,n} i^{m+n} \Im(t - nT) e^{i\pi nt/T}$$

where:

m is an integer representing the frequential dimension;

n is an integer representing the temporal dimension;

t represents time;

T is the time symbol;

$a_{m,n}$ is a real digital coefficient chosen from a pre-set alphabet;

$\Im$ is the prototype IOTA function, (as defined in FR-95 05455, corresponding to U.S. Pat. No. 6,278,686).

To advantage, the transmission capacity of said additional channel is allocated to a given mobile station, dynamically, in the form of at least one "block" defined in the time/frequency space.

By "block" is meant in this instance a subset of the time/frequency space, defined by a given time interval and a frequency band. More complex geometric structures than a "block" are of course conceivable (and possibly decomposable into a "sub-block").

Preferentially, said signalling and control information of said main downlink includes retrieval information of said blocks in the time/frequency space.

According to an embodiment of the invention, at least some of said blocks carry temporal and/or frequential synchronisation references.

This may particularly prove useful when high speed data is transmitted over a substantial period of time. These references may be used to maintain the previously acquired synchronisation.

The invention also concerns cellular radiotelephone systems and methods implementing such a signal.

The invention further concerns the mobile stations of such a cellular radiotelephone system. This mobile station includes in particular reception means of at least one additional channel solely assigned to the downlink, providing in particular high speed data transmission.

According to a preferential embodiment, such a mobile station includes single synchronisation means implementing an analysis of said main channel and delivering synchronisation information to methoding means of said main channel and to methoding means of said additional channel.

Thus, the realisation and implementation of the mobile station are simplified.

In an advantageous embodiment, the mobile station includes a single reception link including particularly transposition means onto an intermediate frequency of a received signal and demodulation means of the transposed signal, said received signal being able to be selectively said main downlink or said additional channel.

To advantage, the mobile station also includes recovery means of said signalling and control information selectively on said main downlink or on said additional channel.

Thus, it is possible to share a part of the reception means between the two channels.

Lastly, the invention also concerns the base stations of such a cellular radiotelephone system, including particularly emission means of at least one additional channel solely assigned to the downlink, ensuring in particular high speed data transmission.

To advantage, such a base station includes transmission means of signalling and control information intended for a given mobile station on said additional channel, when the latter carries high speed data intended for said mobile station.

Other characteristics and advantages of the invention will emerge more clearly from reading the following description of a preferential embodiment, given as an illustrative and non-restrictive example, and the appended drawings, among which:

FIG. 1 evokes the allocation of frequency bands according to the UMTS standard and shows the way in which it can be adapted for the signal of the invention;

As already mentioned, market research on the UMTS has shown that data transmission would represent 80% of the total traffic by 2005, against 20% only for the voice. Data traffic would therefore be, as a consequence, to a very large extent, asymmetrical, with a heavy preponderance of the downlink (Internet).

The signal and the system of the invention meet this type of need.

Figure 1:
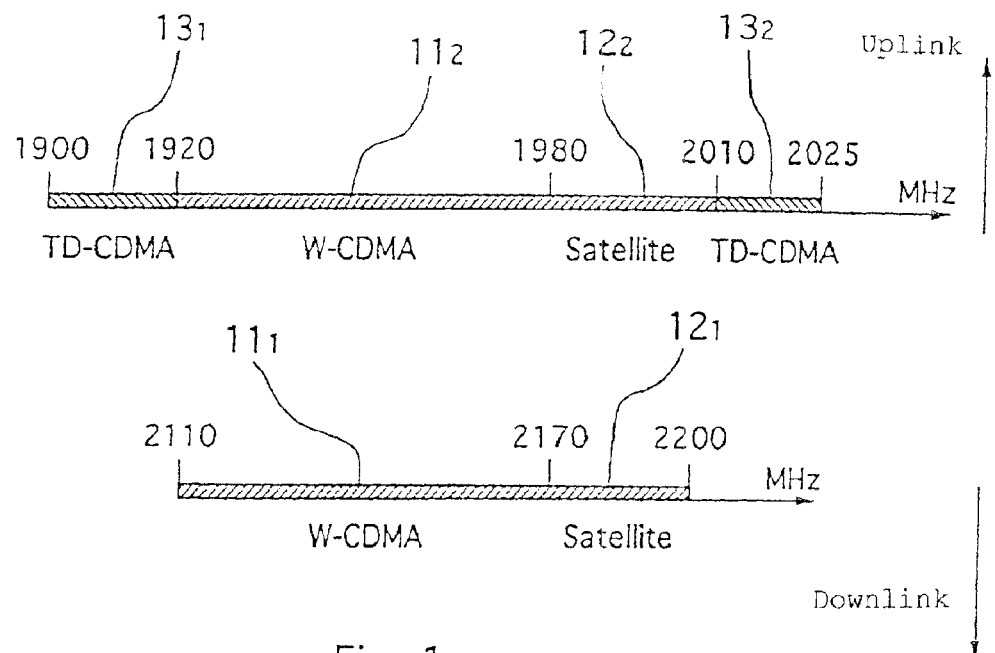

In the embodiment described below, the invention is based on the UMTS standard defined by the ETSI. It therefore uses the following frequency bands, shown in FIG. 1:

1900–1920 MHz: TD-CDMA system in TDD (Time Division Duplex). This band is used for domestic applications ("cordless");

1920–1980 MHz: WCDMA system ("Wideband Code Division Multiple Access"), uplink;

1980–2010 MHz: mobile satellite system (ICO), uplink;

2010–2025 MHz: high speed data transmission system, downlink, specific to the invention;

-2110–2170 MHz: WCDMA system ("Wideband Code Division Multiple Access"), downlink;

-2170–2200 MHz: mobile satellite system (ICO), downlink.

It may be noted therefore that the allocation of resources provided for by the ETSI is, conventionally, symmetrical. Indeed there is clearly:

a downlink $11_1$ and an uplink $11_2$ each of 60 MHz for exchanges according to W-CDMA technology;

a downlink $12_1$ and an uplink $12_2$ each of 30 MHz for exchanges by satellite (ICO);

two TD-CDMA links $13_1$ and $13_2$, whose role was not yet defined and for which the invention proposes a particular implementation.

According to the invention, a combination of channels is used. To obtain an asymmetrical system, a low speed WCDMA ($11_1$ and $11_2$) symmetrical channel and a high speed downlink transmission channel using a multi-carrier system $13_2$ are combined.

The link $13_1$ is for example assigned to domestic applications. For the downlink according to the invention preferentially the link $13_2$ is selected which is frequentially separated from the W-CDMA link $11_2$, which allows easy separation, by filtering, of the two links.

The link $13_2$ may use a conventional multi-carrier modulation, such as that implemented in OFDM systems (see for example the DAB ("Digital Audio Broadcasting") standard for radio broadcasting). Below, the case is considered of an IOTA modulation, which proves particularly adapted to the invention. The principle and implementation of the IOTA modulation are described in patent application FR-95 05455, incorporated by reference.

To illustrate the principle of the invention, the example is considered of a user connecting to the Internet network.

When a channel is initially allocated to a user, only the WCDMA channel $11_1$, 112 is really allocated. This channel is a low speed channel (for example 8 or 16 kbit/s) this channel is used conventionally on the uplink 112, so as to transmit signalling and data issuing from the user.

On the downlink 111, only signalling and low speed data are found as well as the high speed transmission channel 132 control information.

When the user loads a large file, the network allocates to this user an additional resource on the IOTA channel 132. This allocation is carried out dynamically.

The WCDMA down channel 111 transmits control information allowing the additional resource allocated dynamically to the user concerned to be described.

This resource is described for example as the coordinates of a "block" of the time/frequency plane, in which the data will be transmitted. Below is given a form of definition of these "blocks" in the time/frequency plane in relation to FIG. 2.

According to a first embodiment, the WCDMA down channel 111 is still active. In this case, the IOTA speed channel 132 is used exclusively to transmit data. The signalling is still transmitted via the WCDMA down channel 111.

A drawback of this first embodiment is that it presupposes the simultaneous reception of the WCDMA down channel 111 and of the IOTA channel 132.

A second embodiment overcoming this drawback consists in toggling the totality of the downlink information (signalling is given) onto the high speed IOTA channel 132 for the duration of the transmission of the allocated "block".

In this case, a part of the allocated resource is reserved for signalling. There is therefore a double "handover" (synchronous) from the signalling point of view: a first one to toggle the signalling onto the IOTA channel 132, as soon as the transmission of a block starts, and a second one to return automatically onto the WCDMA downlink channel 111, as soon as the transmission of the "block" is complete.

Downlink information can be switched onto the high speed channel or simply duplicated (which simplifies transitions during handovers).

This method is more complex to manage, from the signalling point of view, but, as will emerge subsequently, it simplifies the structure of the mobile receiver.

An embodiment of the signal of the invention is now described in more detail.

The system includes two types of physical channel: WCDMA channels and IOTA channels. To advantage, these two types of channels share a common frame structure.

For example, the totality of the signals may be described from a common 4.096 MHz clock. The transmission unit is the slot (time interval), of a duration of 625 ms. The elementary frame has a duration of 10 ms, that is 16 slots. A multi-frame of 720 ms is also defined.

The WCDMA channels use a chip rate of 4.096 MHz, that is 2560 chips (signal unit) per slot or 40960 chips per frame. The detailed specification can be found in the ETSI documentation (see particularly T doc SMG 905–97) and ARIB (Association of Radio Industries and Business) "specifications of air interface for a 3G mobile system" (18/12/97). The signal emitted comprises particularly all the references necessary for the temporal and frequential synchronisation of the mobile station.

The IOTA channel uses a time symbol T of 125 ms or of 62.5 ms, that is respectively 5 or 10 symbols per slot or again 512 or 256 chips per symbol. The spacing between carriers is 4 KHz in the first case and 8 KHz in the second case.

IOTA technology is described in detail in patent application FR-95 05455 already mentioned. In this document will be found all the information necessary for its implementation, for emission and reception.

The equation of the complex envelope of the transmitted signal is then:

$$x(t) = \sum_{m,n} a_{m,n} i^{m+n} \Im(t-nT) e^{i\pi nt/T}$$

where:
m is an integer representing the frequential dimension;
n is an integer representing the temporal dimension;
t represents time;
T is the time symbol;
$a_{m,n}$ is a real digital coefficient chosen from a pre-set alphabet;
$\Im$ is the prototype IOTA function (as defined in FR-95 05455).

Figure 2:
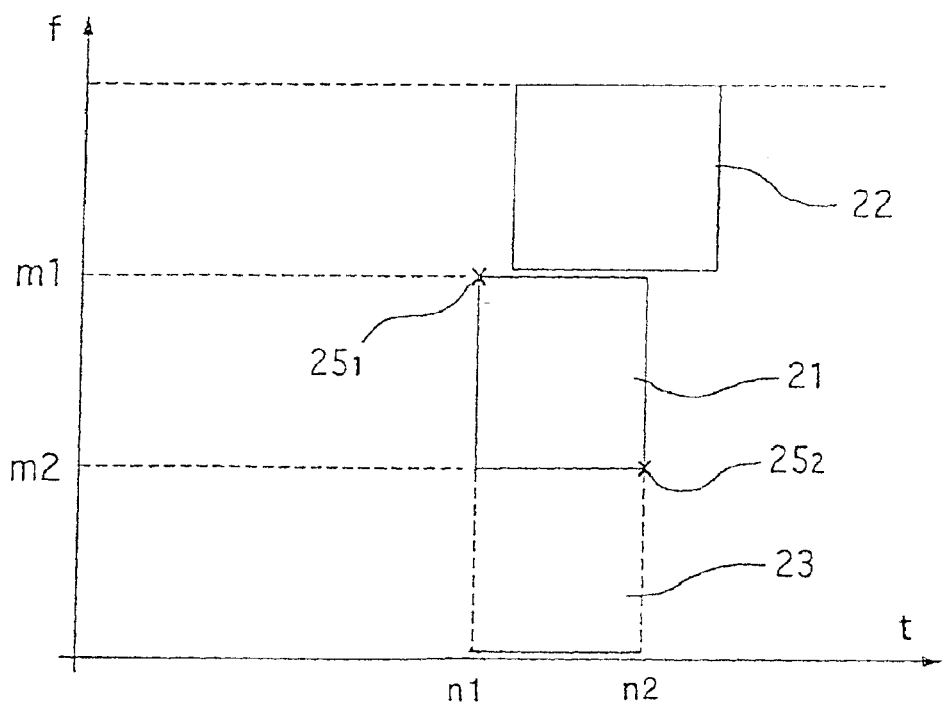
FIG. 2 shows an example of allocation of the high speed resource of the signal of FIG. 1.
Figure 3:
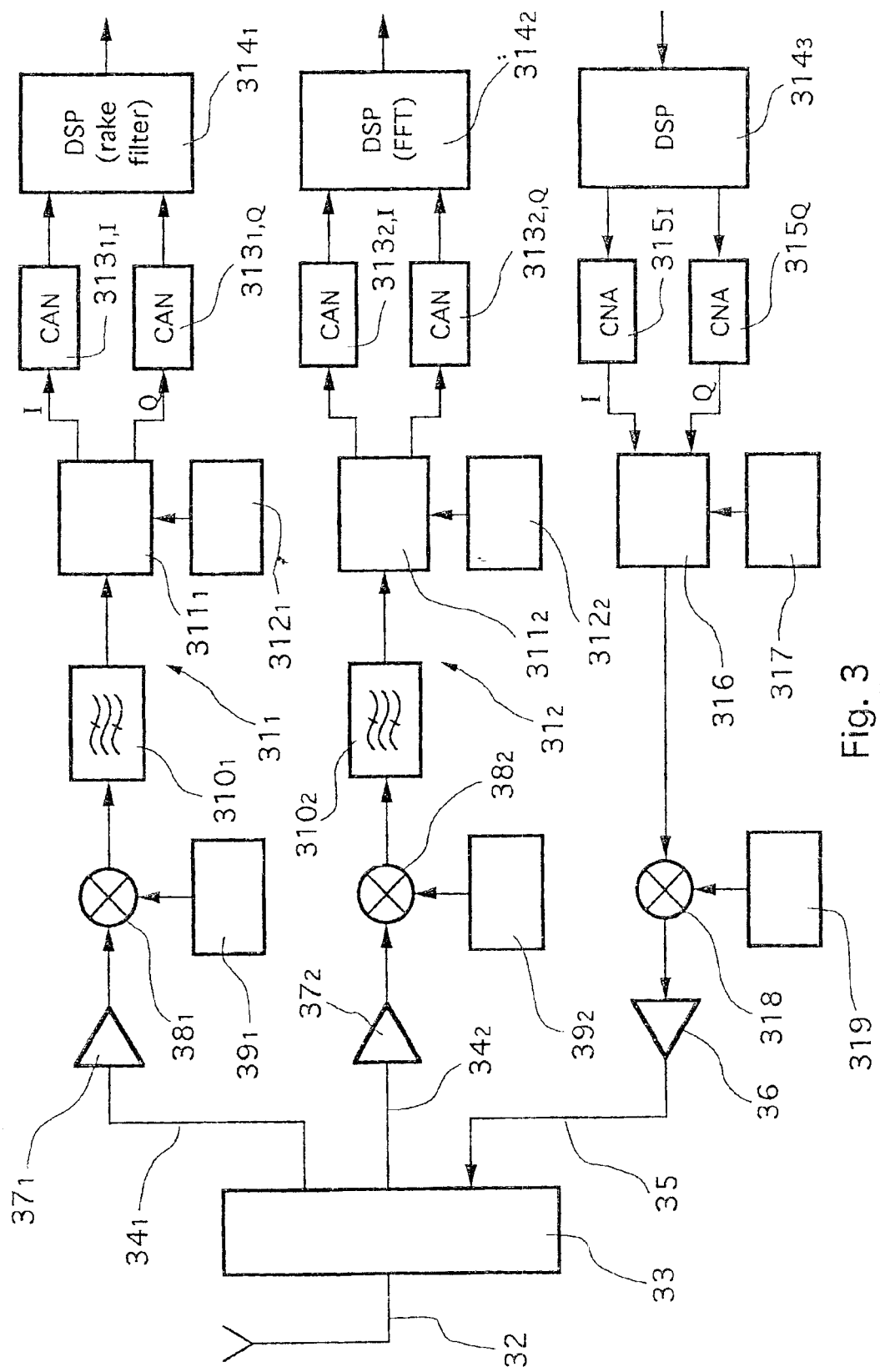
FIG. 3 shows a block diagram of a first embodiment of a mobile receiver according to the invention.
Figure 4:
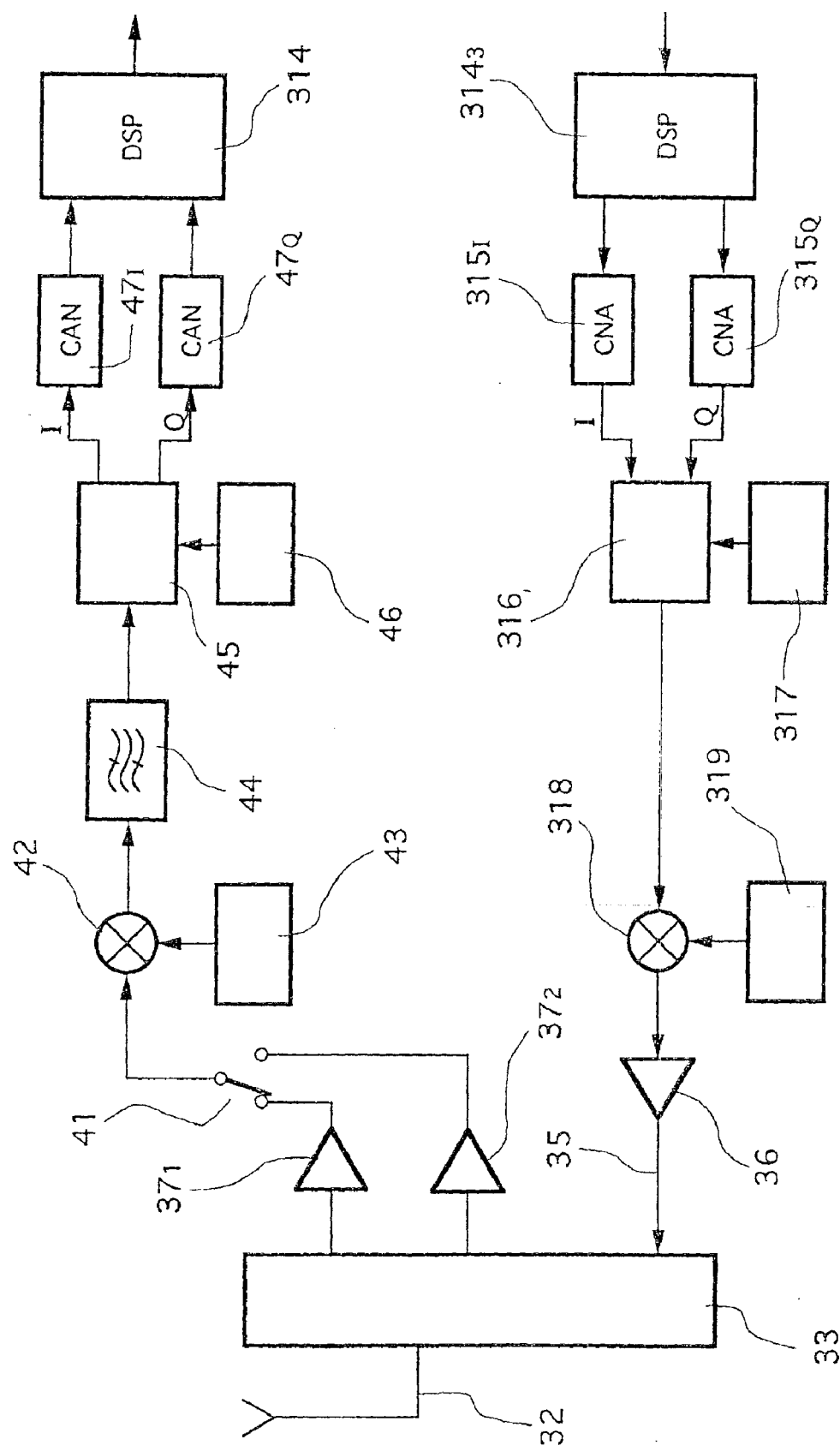
FIG. 4 shows a block diagram of a second embodiment of a mobile receiver according to the invention.

According to the invention, a "block" is defined for example by relationships of framing the temporal index n and the frequential index m, as is shown in FIG. 2. A block is allocated to a particular user.

For example, for a given communication, the network is to transmit a large file. It is allocated the block 21, which corresponds to the resource necessary to transmit the file. The location of this block is retrieved very simply by its two "ends" 251 (m1,n1) and 252 (m2,n2).

Of course, other retrieval methods of data intended for a user are conceivable.

It will be noted that the resource can easily be shared in time (no presupposition as to what precedes or follows the block 21), and in frequency. According to need, the frequency band can be shared, for example with the block 22. When there is no need, no transmission is carried out. Likewise, if only one part of the resource is required, a part of the frequency band 23 is able not be modulated. A part of the data of the "block" can be reserved for the transmission of data transmitted the rest of the time on the main channel, as discussed below.

Two embodiments of a mobile receiver are now described.

In the first option, there is simultaneous reception of the two reception bands. The reception links 311 and 312 are simply duplicated.

The aerial 32 is connected to each of the reception links via a duplexer 33 having two outputs 341 and 342 corresponding to the bands 2110–2170 MHz or 2010–2025 MHz respectively, each output being connected to a reception link. This duplexer 33 also includes an input 35 covering the band 1920–1980 MHz. This input is connected to a power amplifier 36.

Each reception link 311, 312 includes:
a low noise amplifier (LNA) 371 and 372;
a mixer 381,382 and a synthesizer 391,392 allowing one of the two previous bands to be transposed into intermediate frequency;

an IF filter 3101,3102 of a bandwidth of the order of 5 MHz;

an IQ baseband converter 3111, 3112, controlled by a synthesizer 3121,3122;

an analogue-to-digital converter (ADC) 3131,I,3131,Q and 3132,I,3132,Q on each of the I and Q links with a sampling frequency of 8.192 MHz.

Digital methoding (demodulation, decoding) is carried out by a signal methodor (DSP) 314 combined with two "hardware" accelerators:

a correlator for the realisation of the rake filter required for CDMA signal demodulation (3141);

an FFT comethodor for demodulation of IOTA signals (3142).

The DSP, combined with a "hardware" accelerator for modulation, also generates WCDMA signals to be emitted in the form of digital I and Q samples (3143).

The emission link includes:

a digital-to-analogue converter 315I,315Q on each of the I and Q links with a sampling frequency of 8.192 MHz;

an IF modulator 316 controlled by a synthesizer 317;

a mixer 318 and a dynamic synthesizer 319 allowing signals to be transposed into intermediate frequency in the emission band;

a power amplifier 36.

The synchronisation of the mobile station for reception of WCDMA signals uses conventional techniques in this domain, and particularly the Rake filter for temporal synchronisation.

Once the reference oscillator and the mobile time base have been compelled, this synchronisation is used directly for the reception of IOTA signals, for which no additional synchronisation method is required.

Thus there is a direct benefit derived from the quality and facility of synchronisation of CDMA technology when high speed data is received, without adaptation (the frame structures being the same).

In the second option, there is no simultaneous reception of the two reception bands. This markedly simplifies the structure of the receiver. The duplexer 33 and the emission link are identical to the first option. They are therefore not subject to further comment.

The receiver includes:

a low noise amplifier (LNA) 371 connected to the 2170–2200 MHz output of the duplexer;

a low noise amplifier (LNA) 372 connected to the 2010–2025 MHz output of the duplexer;

a switch 41 allowing the two LNA outputs to be switched;

a mixer 42 and a double band synthesizer 43 allowing the two previous bands to be transposed into intermediate frequency;

an IF bandpass filter 44 of a bandwidth of the order of 5 MHz;

an IQ baseband converter 45 controlled by a synthesizer 46;

an analogue-to-digital converter 47I,47Q on each of the I and Q bands, with a sampling frequency of 8.192 MHz.

Reception digital methoding 314 is identical to that of the first option. On the other hand, there is no simultaneous methoding of WCDMA signals and of IOTA signals, which reduces the CPU load of the DSP methodor 314.

The synchronisation of the mobile station for the reception of WCDMA signals is identical to that described previously. Once the reference oscillator and the mobile station time base are compelled, this initial synchronisation is used directly for the reception of IOTA signals, for which no additional synchronisation method is required.

However, the reception of WCDMA signals being then interrupted, the maintenance of this synchronisation must however be provided by other means. Nonetheless, as a general rule, the transmission of a block is relatively short, and it is not necessary to re-synchronise the mobile station, the inherent stability of the reference oscillator being more than adequate for a few seconds. However, if the allocation is of long duration, it might then be necessary to insert periodically additional temporal and frequential synchronization references.

What is claimed is:

1. A cellular radiotelephone signal, comprising a main symmetrical bidirectional channel, including a main uplink and a main downlink, providing in particular low or medium speed transmission of signaling and control data and information, wherein said signal includes at lest one additional channel solely assigned to downlink, with no corresponding symmetrical uplink channel, providing in particular high speed data transmission wherein said additional channel implements a multi-carrier technology providing distribution of data in the time frequency space, wherein said additional channel has a complex envelope responding to the following equation:

$$x(t) = \sum_{m,n} a_{m,n} i^{m+n} \Im (t - nT) e^{j2\pi nt/T}$$

where:

m is an integer representing the frequential dimension;

n is an integer representing the temporal dimension;

t represents time;

T is the time symbol;

$a_{m,n}$ is a real digital coefficient chosen from a pre-set alphabet;

$\Im$ is the prototype IOTA function, which is a function identical to its Fourier Transform.

* * * * *